April 7, 1931.   J. H. C. BOYD   1,799,950
SCISSORS, SHEARS, AND THE LIKE
Original Filed April 4, 1928
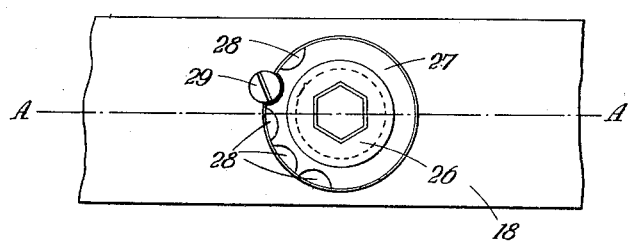
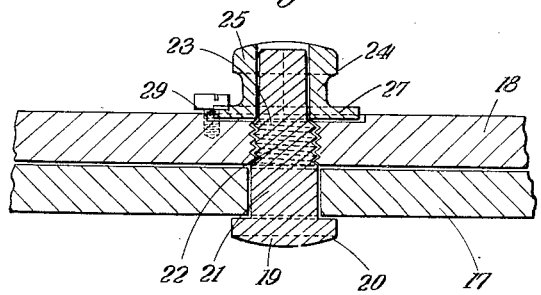
Inventor,
James H. C. Boyd.
Attorney.

Patented Apr. 7, 1931

1,799,950

UNITED STATES PATENT OFFICE

JAMES HENRY CARTNER BOYD, OF SLOUGH, ENGLAND

SCISSORS, SHEARS, AND THE LIKE

Original application filed April 4, 1928, Serial No. 267,334, and in Great Britain November 30, 1927. Divided and this application filed June 29, 1929. Serial No. 374,757.

This invention relates to improvements in scissors, shears and the like, and particularly to an improved construction of pivot screw for such tools.

Hitherto the pair of blades themselves, or the pair of carriers for the blades in those constructions in which use is made of detachable blades and constituting when assembled the complete tool, have more usually been held together by means of a screw formed with a shoulder passing through one of the blades or carrier members, hereinafter referred to as the moving member and adapted to come up against the other blade or carrier member hereinafter referred to as the fixed member, said screw being adapted to engage in a screw tapping formed on such latter member after which that end of the screw thread projecting beyond the outer surface of said fixed member is then burred or riveted over to hold the screw in position.

In the cheaper construction of scissors the shoulder on the screw above referred to is even dispensed with, and the end of the screw when brought initially by a skilled operator to the required position enabling the cutting operation to be carried out in the most satisfactory manner, is then burred or riveted over as above described.

Such methods of attachment possess very serious disadvantages which not only reduce the effective life of the tool, but also prevent any correction being made and which may be necessary due to wear of the tool developing either on the cutting edge or on the curved heel portion of the blades adjacent to the pivot screw, such disadvantages resulting from the fact that when the screws formed with a shoulder are used, it is not practicable to reduce the height of the shoulder to make up for the variable amount of wear which has taken place, and which must be corrected whilst when screws formed with a shoulder, or screws of ordinary cylindrical shape throughout their length are used, the burring or riveting operation above referred to damages the screw thread on the screw, and often the screw thread on the fixed carrier, to such an extent as either to hold the screw so tightly that it cannot be moved or to damage the screw and the threaded portion on the fixed carrier to such an extent that both parts are rendered useless.

The object of the present invention is to obviate the very serious disadvantages previously referred to, and to provide a construction of pivot screw so designed that not only will it be possible to adjust the pivot screw according to the various degrees of wear consequent upon the ordinary use of the scissor, but will also enable said screw to be removed without any liability to damage either the screw or the fixed member on which it is carried, such novel construction also enabling the operator readily to adjust the relative tightness of the mutual engagement of the cutting edges to suit either the particular material being severed or the practical or personal convenience of the operator.

To these ends scissors, shears and the like constructed in accordance with the present invention, comprise a fixed blade member, a movable blade member, a pivot screw passing freely through said movable blade member and being in threaded engagement with said fixed blade member, said pivot screw being formed with a polygonal extension, in combination with a flanged locking member the flange of which is formed with a series of notches for the accommodation of a locking screw in threaded engagement with said fixed blade member, whereby the position of the flanged locking member relatively to the pivot screw may be varied to obtain a micrometer-like adjustment of the operative position it is desired to adopt.

The invention will now be described with reference to the accompanying drawings wherein Figure 1 is a partial plan view of the hinge portion of a pair of scissors fitted with one form of pivot screw and locking means, whilst Figure 2 is a section on line A—A of Figure 1.

As shown the scissors comprise, as usual, a pair of blades 17 and 18 respectively, 17 being a moving member whilst 18 is the fixed member. The two blades 17 and 18 are secured together by means of a pivot pin 19, formed with a milled head portion 20, and with a cylindrical portion 21 engaging in a correspondingly sized aperture formed in the moving member 17. That portion of the pivot screw 19 extending beyond the cylindrical portion 21 is formed with a screw threaded portion 22 adapted to engage in a correspondingly threaded aperture in the fixed member 18, and with a hexagonal extension 23. The locking member consists of a head 24 formed with a milled surface 25 and with a hexagonal axial aperture 26 adapted to receive the correspondingly shaped extension 23 of the screw 19. The head portion 24 is formed with a flanged portion 27 in which are shaped a plurality of countersunk recesses 28 . . . , in any of which is adapted to engage the head of a screw 29 adapted, when the head 24 has been brought to the required position, to prevent further movement. A micrometer-like adjustment of the head 24 is obtained by unscrewing slightly the screw 29, so as to enable the head thereof to become disengaged from that recess 28 in which it has been engaged, and rotating slightly the head portion 24 until the required adjustment is obtained, after which the screw 29 is screwed down into one of the other recesses 28 above described, thus locking the parts in the new position.

The above construction has been described and illustrated as applied to scissors of usual construction, but the construction is eminently suitable for use in combination with scissors, shears and the like as described in my application for a British patent No. 28,188, 1926, as the combination in a single article of detachable blades as described in such application with the constructional form of pivot screw as described in the present application results in an article possessing advantages as regards general efficiency, facility of adjustment, correction for wear, and adjustment to particular conditions of use, which are not found in the more usual forms of scissors as at present constructed.

I claim:—

In scissors, shears, and the like having a fixed blade member, a movable blade member, with a pivot screw passing freely through said movable blade member and in threaded engagement with said fixed blade member, said pivot screw being formed with a polygonal extension beyond the fixed blade member, the combination of a flanged locking member with a knob-like portion provided with a socket opening fitting said polygonal extension, the flange of said member being notched about its periphery, and a locking screw in threaded engagement with said fixed blade member and adapted by entering the notches in said flange to lock the screw from turning said knob-like portion of the locking member being adapted for turning the screw for adjustment when said locking screw is withdrawn from the notches of said flange.

JAMES HENRY CARTNER BOYD.